(12) United States Patent
Finley

(10) Patent No.: US 6,168,212 B1
(45) Date of Patent: Jan. 2, 2001

(54) TWIST-LOCK CONNECTOR FOR ADJUSTABLY INTERLOCKING TELESCOPIC TUBULAR MEMBERS

(75) Inventor: Richard O. Finley, Upland, CA (US)

(73) Assignee: The United Electric Company of Ohio, Burlington, NC (US)

(*) Notice: Under 35 U.S.C. 154(b), the term of this patent shall be extended for 0 days.

(21) Appl. No.: 09/348,627

(22) Filed: Jul. 6, 1999

(51) Int. Cl.[7] .................................................... F16L 19/00
(52) U.S. Cl. ........................... 285/377; 285/7; 285/302; 285/394; 285/362
(58) Field of Search .............................. 285/7, 302, 314, 285/358, 359, 394, 377, 401, 362

(56) References Cited

U.S. PATENT DOCUMENTS

| | | | |
|---|---|---|---|
| 2,818,280 | * | 12/1957 | Budnik . |
| 2,941,822 | * | 6/1960 | Moecker . |
| 3,279,828 | * | 10/1966 | MacFarland ............................. 285/1 |
| 3,596,946 | * | 8/1971 | Burton . |
| 3,601,764 | * | 8/1971 | Cameron . |
| 3,645,562 | * | 2/1972 | Fandetti et al. . |
| 3,876,234 | * | 4/1975 | Harms . |
| 4,758,023 | * | 7/1988 | Vermillion . |
| 4,793,646 | * | 12/1988 | Michaud, Jr. . |
| 5,039,139 | | 8/1991 | McElroy et al. . |
| 5,190,224 | * | 3/1993 | Hamilton . |
| 5,333,915 | * | 8/1994 | Sparling . |
| 5,356,183 | * | 10/1994 | Cole . |
| 5,401,061 | | 3/1995 | Yamashita . |
| 5,460,176 | * | 10/1995 | Frigger . |
| 5,462,311 | * | 10/1995 | Cipolla . |
| 5,741,084 | * | 4/1998 | Del Rio et al. . |
| 5,836,620 | * | 11/1998 | Wang et al. . |

* cited by examiner

Primary Examiner—Lynne H. Browne
Assistant Examiner—Tomlyne A Malcolm
(74) Attorney, Agent, or Firm—Stevens, Davis, Miller & Mosher, L.L.P.

(57) ABSTRACT

A twist-lock connector for adjustably connecting interlocking telescopic tubular members includes a camming surface on the interior surface of a rotatable member which cooperates with the camming member of a seating member attached to a first tubular member. The twist-lock connector is employed by inserting the male end of a second tubular member inside the female end of a first tubular member to which the seating member is attached, and rotating the rotatable member in a first direction until the camming action causes the engaging surface of the seating member to lock by frictionally engaging the outer surface of the second tubular member. Disconnection of the tubular members is effected by reversing the order of the steps for connection. The twist-lock connector also includes an overtightening protection feature. When the rotatable member is rotated in the first direction relative to the seating member by approximately 180°, the lock is released, but without breakage of the twist-lock connector. Advantages associated with the twist-lock connector include not only the overtightening protection feature, but both the mechanical integrity of the connection and the ease of operation of the connector, including the ability to easily adjust the axial length of the telescoping tubular members.

7 Claims, 4 Drawing Sheets

TWIST-LOCK CONNECTOR FOR ADJUSTABLY INTERLOCKING TELESCOPIC TUBULAR MEMBERS

BACKGROUND OF THE INVENTION

1. Field of the Invention

This invention relates generally to a means for adjustably connecting telescopic tubular members. The invention relates more specifically to a twist-lock connector for adjustably interlocking telescopic tubular members. The invention relates even more specifically to a twist-lock connector for adjustably interlocking telescopic vacuum cleaner tubes.

2. Description of Related Art

Various conventional devices exist for connecting telescopic tubes. For example, U.S. Pat. No. 2,941,822 describes a wand lock for a vacuum cleaner in which a retaining catch member in the form of a pin in an inner wand tube extends through a circular opening in the wall of an outer wand tube so as to connect the tubes.

U.S. Pat. No. 4,758,023 describes a connection assembly for a vacuum device which permits the connection of two members in a relatively fixed rotational and longitudinal relationship, yet which permits their subsequent disconnection without requiring any specialized tools. In connecting the members, an integral extension portion of a flexible hose member is telescopically inserted into an inlet plug to a predetermined longitudinal stopping point, and then rotated to engage projections on the extension portion with projection-receiving holes in the inlet plug.

U.S. Pat. No. 5,039,139 describes a tube spring steel tab lock coupling connector for joining together a first tube and a second tube. The connector consists of locking tabs mounted externally on the first tube which trap a return bend on the exterior of the second tube so as to lock the first and second tubes against disconnection.

U. S. Pat. No. 5,401,061 describes a suction pipe coupling mechanism for vacuum cleaners in which a joint pipe is inserted in the connecting end of a second suction pipe. The joint pipe has an elastic sealing member which expands radially outward against the inner periphery of the connecting end of the second suction pipe.

U. S. Pat. No. 5,460,176 describes a positive locking device for connecting an inner cannula with an outer cannula to form a tracheostomy tube device. The device consists of a connector head or connector body having ribs and or lips with catches disposed thereon. Cantilevered members with latch receiving members corresponding to the catches are provided on the component (connector or connector head) not having the rib or lip. Catches and latch receiving members interlock and a securing component is fixed over the connector and connector head to create a positive lock.

While the aforementioned devices may facilitate the connection of the members, a drawback associated with each of the devices is that the connected members have a fixed longitudinal relationship, i.e., a fixed length.

U.S. Pat. No. 4,793,646 describes an adjustable interlocking telescopic handle and arm assembly. The assembly consists of a first tube having spring-loaded mounting posts which extend through post-receiving holes in a second tube so as to lock the first and second tubes in position. Because the second tube has a plurality of post-receiving holes, the combined length of the tubes can be adjusted. While the combined tube length can be adjusted, the number of positions to which the tubes can be adjusted is not infinite, but rather is limited to those positions defined by the locations of the post-receiving holes.

U.S. Pat. No. 5,462,311 describes an adjustable telescoping wand assembly for vacuum cleaners. The assembly includes a collet which is positioned within a second tube and which encircles a first tube. The collet has a collar, a pair of fingers, a pair of teeth, and an L-shaped slot which defines a flexible section. The inner periphery of the collet also has a longitudinal rib which cooperates with a groove which extends along the length of the outer periphery of the first tube. The longitudinal rib and the groove are necessary to prevent rotation of the first tube in relation to the collet. The first tube is locked in place relative to the second tube by rotating the first tube so as to bring a flexible section of the collet to bear on the outer periphery of the first tube, as the flexible section is urged inwardly by a shelf provided in the second tube.

None of the aforementioned devices, however, provides a connector which not only ensures a secure connection between the tubes, but which is easy to operate and which facilitates an adjustment in the axial length of the telescoping tubular members.

SUMMARY OF THE INVENTION

It is an object of the present invention to provide a means for adjustably connecting interlocking telescopic tubular members which facilitates both their connection and disconnection., and the adjustment of the axial length of the connected telescoping members, yet which also provides; a secure attachment between the members.

Accordingly, the present invention advantageously relates to a twist-lock connector for adjustably connecting interlocking telescopic tubular members. The twist-lock connector comprises a seating member for attaching to a female end of a first tubular member, and a rotatable member for rotatably mounting on the seating member. The seating member comprises has a cylindrical base portion and first and second arcuate, cantilevered camming members connected to the cylindrical base portion at diametrically opposed positions and projecting from cylindrical base portion in an axial direction relative to the cylindrical base portion. Each of the first and second arcuate, cantilevered camming members has on its inner periphery a seating member camming surface and on its outer periphery a seating member engaging surface. The seating member engaging surfaces engage the outer surface of the second tubular member.

The first and second arcuate cantilever camming members are diametrically opposed to one another relative to the axial direction and together with an outer edge of the cylindrical base portion form an annular engagement groove for receiving the rotatable member. The first and second camming members are spaced apart from each other so as to define first and second gaps, respectively, therebetween and so as to enable their cantilevered ends to flex.

The rotatable member has on its inner periphery first and second rotatable member camming surfaces for engagement with the first and second seating member camming surfaces of the first and second camming members. Each of the first and second rotatable member camming surfaces form gradual camming ramps which terminate in diametrically opposed step portions.

The seating member camming surfaces of the first and second camming members and the first and second rotatable member camming surfaces cooperate with each other such that when the rotatable member is rotated in a first direction relative to the seating member, the twist-lock connector forms a secure connection between the second tubular member and the first tubular member, referred to hereinafter as a state of being locked.

The twist-lock connector is employed by inserting the male end of a second tubular member inside the female end of a first tubular member to which the seating member is attached, and rotating the rotatable member in a first direction until the camming action causes the engaging surface of the camming member to lock by frictionally but releasably engaging the outer surface of the second tubular member. Disconnection of the tubular members is effected by reversing the order of the steps for connection.

The invention further relates to a twist-lock connector comprising an overtightening protection feature. When the rotatable member is rotated in the first direction relative to the seating member by approximately 180°, the lock is released, but without breakage of the twist-lock connector.

Advantages associated with the twist-lock connector include not only the overtightening protection feature, but both the mechanical integrity of the connection between tubular members and the ease of operation of the connector, including the ability to easily adjust the axial length of the telescoping tubular members.

BRIEF DESCRIPTION OF THE DRAWINGS

Other objects, features, and advantages of the present invention will become more fully apparent from the following detailed description of the preferred embodiments, the appended claims and the accompanying drawings. As depicted in the attached drawings:

DESCRIPTION OF THE PREFERRED EMBODIMENTS

The present invention will be disclosed in terms of the currently perceived preferred embodiments thereof.

Figure 1:
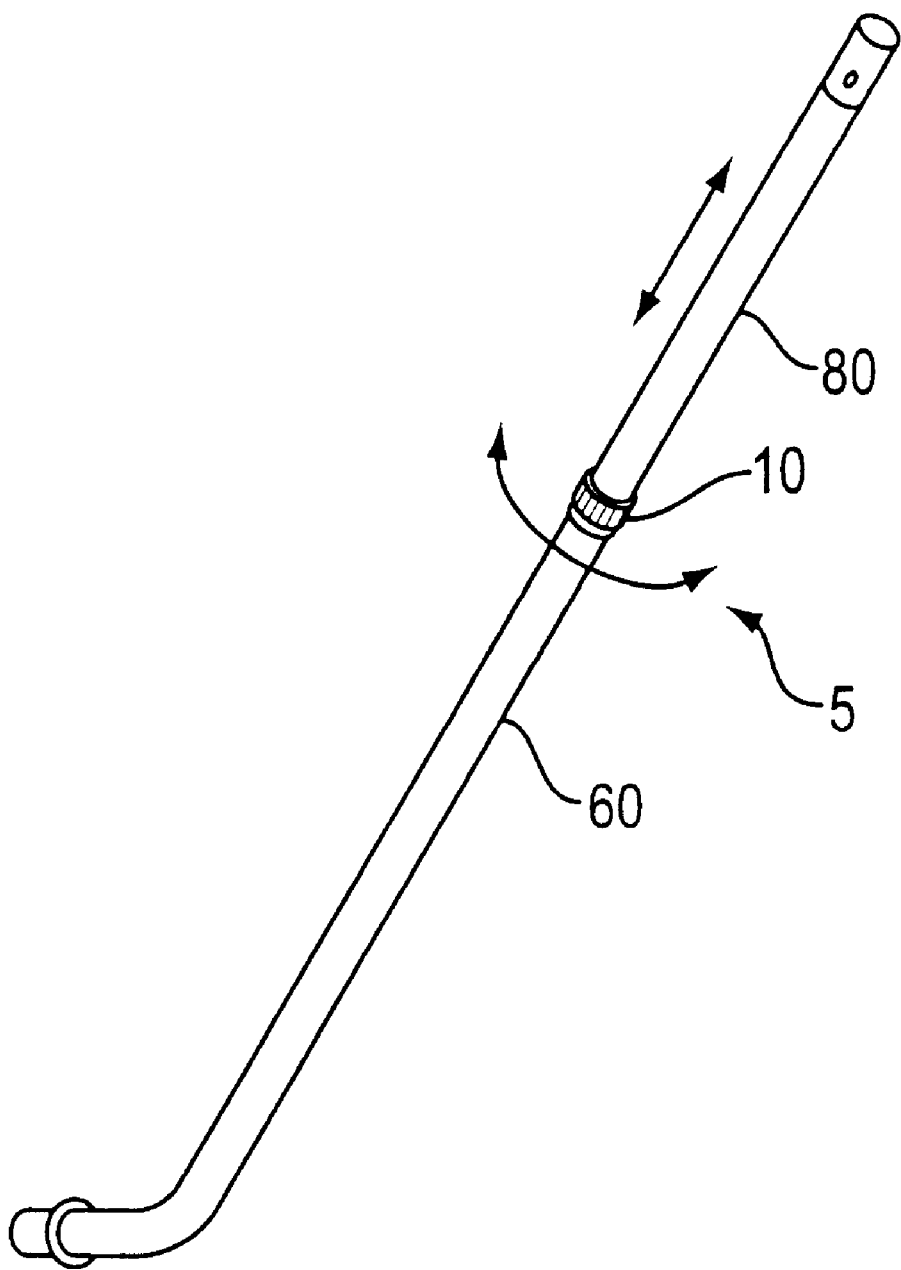
FIG. 1 is a perspective view of a an adjustably interlocking telescopic tubular member assembly comprising a twist-lock connector, a first tubular member, and a second tubular member.

Referring to FIG. 1, an adjustably interlocking telescopic tubular member assembly 5 comprises a twist-lock connector 10 in operative communication with a first tubular member 60 and a second tubular member 80. First tubular member 60 has a first tubular member inner diameter that is capable of accommodating a second tubular member outer diameter of second tubular member 80. Twist-lock connector 10 releasably interlocks first tubular member 60 with second tubular member 80.

Figure 2:
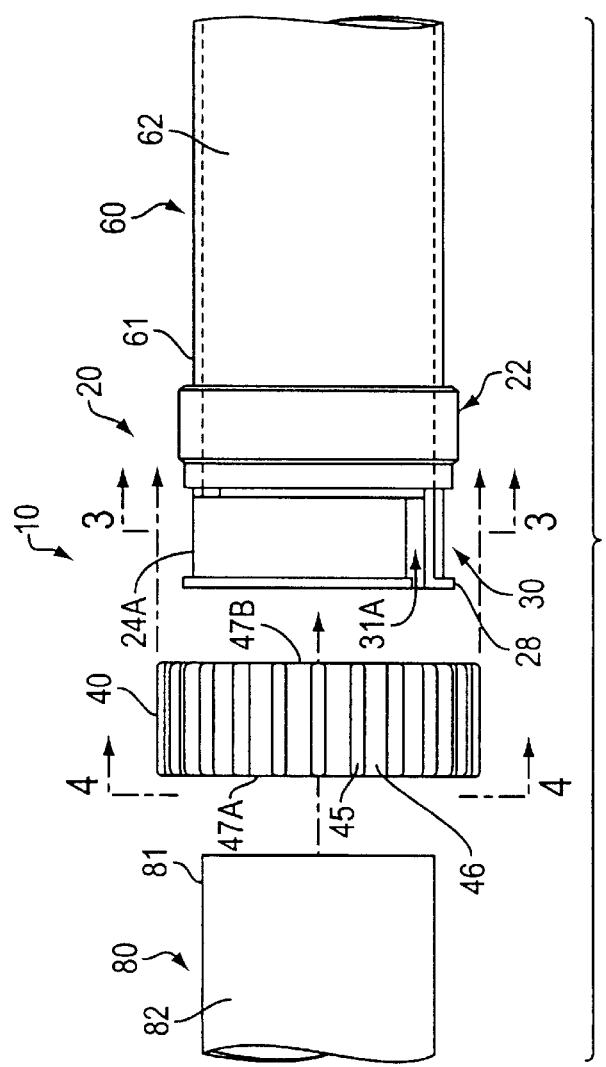
FIG. 2 is an exploded side elevational view of the twist-lock connector, first tubular member, and second tubular member.

As depicted in FIG. 2, twist-lock connector 10 comprises a seating member 20 for attaching to a female end 61 of a first tubular member 60, and a rotatable member 40 for rotatably mounting on the seating member 20.

Figure 3:
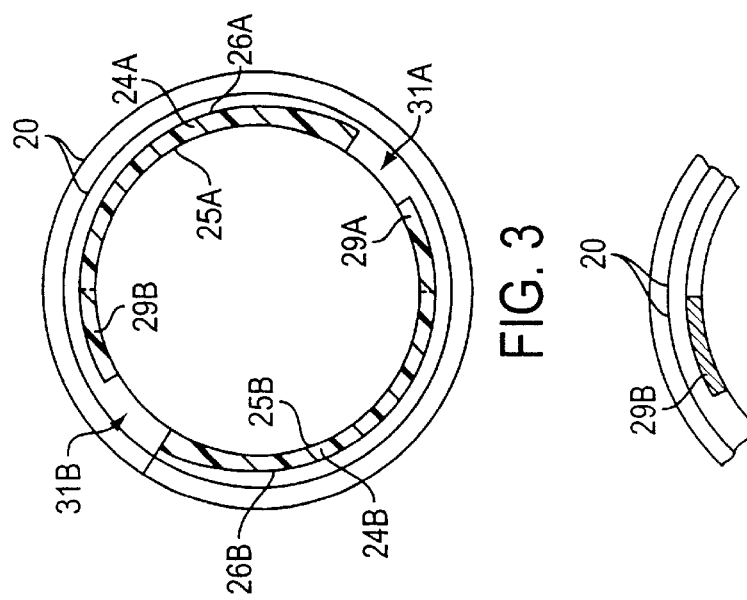
FIG. 3 is a sectional view of a seating member of the twist-lock connector taken substantially along the line 3—3 of FIG. 2.
Figure 4:
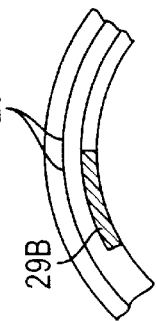
FIG. 4 is a partial sectional view of a camming member portion of the seating member taken substantially along the line 3—3 of FIG. 2.

Referring to FIGS. 2—4, seating member 20 comprises a cylindrical base portion 22 and first and second arcuate, cantilevered camming members 24A and 24B connected to cylindrical base portion 22 at diametrically opposed connection positions and projecting from cylindrical base portion 22 in an axial direction relative to the cylindrical base portion. As depicted in FIG. 3, each of the first. and second camming members 24A and 24B has on its inner periphery a seating member camming surface 25A and 25B, respectively, and on its outer periphery a seating member engaging surface 26A. and 26B, respectively. Seating member engaging surfaces 26A and 26B engage the outer surface 82. of second tubular member 80.

First and second camming members 24A and 24B, each of which comprises a base portion 29A and 29B, respectively, are diametrically opposed to one another relative to the axial direction and together with an outer edge 28 of cylindrical base portion 22 form an annular engagement groove 30 for receiving rotatable member 40. First and second camming members 24A and 24B are spaced apart from each other circumferentially of the seating member so as to define first and second gaps 31A and 31B, respectively, therebetween and so as to enable their cantilevered ends to flex relative to the connection positions. FIG. 4 illustrates base portion 29B of camming member 24B, i.e., that portion of the camming member which forms the cantilever to connect a flexible portion of the camming member 24B to cylindrical base portion 22.

Seating member 20 is permanently mounted on the female end of first tubular member 60 so as to engage the outer surface 62 and one annular end of first tubular member 60. The cylindrical base portion 22 of seating member 20 is mounted using a means for adhering, such as a contact cement, which is capable of ensuring a secure attachment between tubular member 60 and seating member 20.

Figure 5:
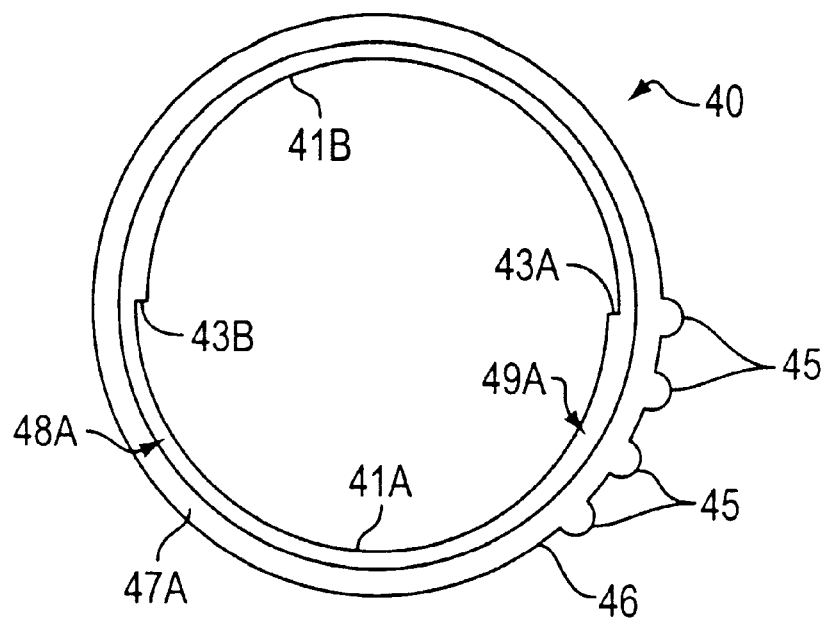
FIG. 5 is a sectional view of a rotatable member of the twist-lock connector taken substantially along the line 4—4 of FIG. 2.

Referring to FIG. 5, rotatable member 40 having first and second annular surfaces 47A and 47B (surface 47B is depicted only in FIG. 2) has on its outer periphery 46 a pattern of knurls 45 to facilitate rotation of the rotatable member. Rotatable member 40 comprises on its inner periphery first and second rotatable member camming surfaces 41A and 41B for engagement with the first and second seating member camming surfaces 25A and 25B of the first and second camming members 24A and 24B, respectively. Each of first and second rotatable member camming surfaces 41A and 41B form gradual camming ramps which terminate in diametrically opposed first and second step portions 43A and 43B, respectively. The camming ramps comprise first and second camming ramps. edges 48A and 48B disposed perpendicular to the plane of the camming surfaces 41A and 41B. Disposed annularly between each of first and second camming ramps edges 48A and 48B and the plane of first and second annular surfaces 47A and 47B are grooves 49A and 49B, with groove 49A capable of engaging outer edge 28 of cylindrical base portion 22.

Figure 6:
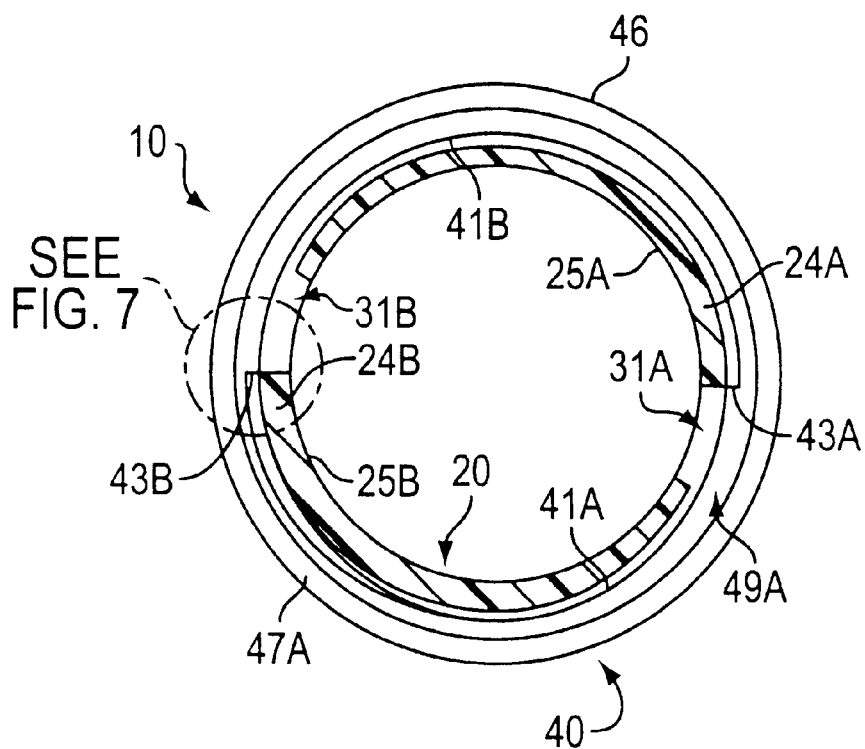
FIG. 6 is a sectional view of the rotatable member in operative communication with the seating member in which the rotatable member is in the fully unlocked position.
Figure 7:
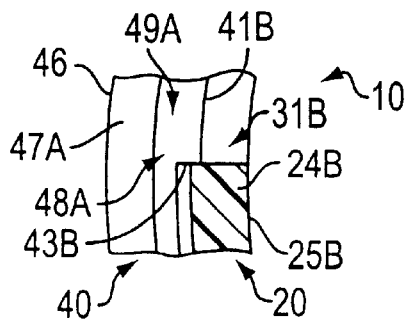
FIG. 7 is an enlarged partial sectional view of the connector illustrated in FIG. 6.
Figure 8:
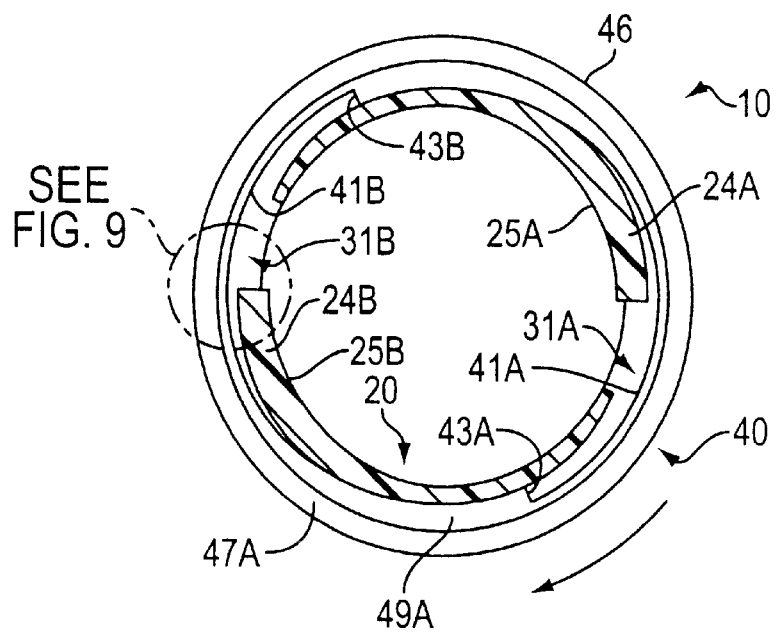
FIG. 8 is a sectional view of the rotatable member in operative communication with the seating member in which the rotatable member has been partially rotated in a first direction.
Figure 9:
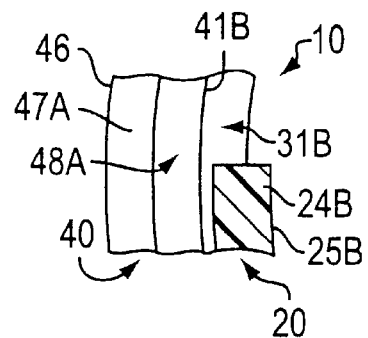
FIG. 9 is an enlarged partial sectional view of the connector illustrated in FIG. 8.

As depicted in FIGS. 6—9, the seating member camming surfaces 25A and 25B of first and second camming members 24A and 24B and the first and second rotatable member camming surfaces 41A and 41B (FIG. 5) cooperate with each other such that when rotatable member 40 is rotated in a first direction relative to seating member 20, twist-lock connector 10 securely connects, i.e., locks, the second tubular member and the first tubular member. When rotatable member 40 is rotated in a second direction opposite to the first direction, the lock is released. For example, FIGS. 6 and 7 illustrate the relative positions of seating member 20 and rotatable member 40 when the twist-lock connector is in the fully unlocked position, and FIGS. 8 and 9 illustrate the relative positions of seating member 20 and rotatable member 40 when rotatable member 40 has been partially rotated in the first direction.

Furthermore, twist-lock connector 10 also comprises an overtightening protection feature. If rotatable member 40 is rotated in the first direction relative to seating member 20 by approximately 180° from the initial position of the rotatable member, the lock is released (FIG. 6), yet without breakage of any of the parts of the twist-lock connector. Accordingly, regardless of how far rotatable member 40 is rotated relative to seating member 20, there will be no breakage of parts, because the locking action disengages when the step portions 43A and 43B of the first and second rotatable member camming surfaces 41A and 411 reach the gaps 31A and 31B between the ends of the first and second arcuate cantilevered camming members 24A and 24B. Thus, to properly lock the twist-lock connector, rotatable member 40 is rotated in the first direction to a point less than approximately 180° from the initial position of the rotatable member until the camming action causes each of the first and second seating member engaging surfaces 26A and 26B of seating member 20 to lock by frictionally engaging the outer surface 82 of second tubular member 80.

The twist-lock connector can be employed in any service which requires a secure but easily lockable and unlockable connection between interlocking telescopic tubular members. Examples of. such applications include any type of telescoping wands, poles, conduits, or tubes, such as vacuum cleaner tubes, which are employed in a service in which it may be desirable to adjust the combined length of the tubular members.

The method of employing the twist-lock connector 10 comprises the following series of manipulative steps. First, male end 81 of second tubular member 80 is inserted inside female end 61 of first tubular member 60 a distance sufficient to provide a desired combined length of second tubular member 80 and first tubular member 60. To provide a secure connection and thereby avoid undesirable flexing of the connected tubular members, male end 81 of second tubular member 80 should be inserted inside female end 61 of first tubular member 60 an axial distance that is sufficient to ensure that the tubular members are interlocked.

Twist-lock connector 10 is then locked by rotating rotatable member 40 in the first direction until the first and second rotatable member camming surfaces 41A and 41B engage the first and second seating member camming surfaces 25A and 25B, respectively, thereby causing the first and second seating member engaging surfaces 26A and 26B to fuctionally but releasably engage the outer surface 82 of the second tubular member 80.

As indicated above, the overtightening protection feature ensures that if rotatable member 40 is rotated in the first direction relative to seating member 20 by approximately 180° from the initial position of the rotatable member, the lock will release when the step portions 43A and 43B of first and second rotatable member camming surfaces 41A and 41B reach first and second gaps 31A and 31B between the ends of first and second camming members 24A and 24B. In this instance, to properly lock the twist-lock connector one simply repeats the step of rotating rotatable member 40 in the first direction, but stops the rotation at a locking position disposed between a first position where the first and second rotatable member camming surfaces 41A and 41B first engage the first and second seating member camming surfaces 25A and 25B and a second position where the step portions 43A and 43B of the first and second rotatable member camming surfaces 41A and 41B reach the gaps 31A and 31B between the first and second camming members 24A and 24B (i.e., a position before the aforementioned approximately 180° position), thereby frictionally but releasably locking first and second seating member camming surfaces 25A and 25B with the outer surface 82 of second tubular member 80.

Twist-lock connector 10 can be unlocked by reversing the order of the steps for locking. That is, rotatable member 40 is rotated in a direction opposite to that for locking until first and second. rotatable member camming surfaces 41A and 41B disengage from first and second seating member camming surfaces 25A and 25B, thereby allowing first and second seating member engaging surfaces 26A and 26B to disengage from the outer surface 82 of the second tubular member 80.

Once twist-lock connector 10 has been unlocked, second tubular member 80 can either be removed from first tubular member 60, or an adjustment can be made in the combined length of the tubes. To shorten the combined length of the tubes, the male end 81 of second tubular member 80 is inserted farther into the female end 61 of first tubular member 60, and twist-lock connector 10 is then locked as described above.

To lengthen the combined length of the tubes, the male end 81 of second tubular member 80 is withdrawn the desired distance from the female end 61 of first tubular member 60, and twist-lock connector 10 is then locked as described above. As indicated above, to provide a secure connection and thereby avoid undesirable axial flexing of the connected tubular members, male end 81 of second tubular member 80 should be inserted inside the female end 61 of first tubular member 60 an axial distance that is sufficient to ensure that the tubular members are interlocked.

The present invention, therefore, provides a means for adjustably connecting interlocking telescopic tubes which not only facilitates connection and disconnection while providing overtightening protection, but which also provides a secure attachment of the tubes once connected. Advantages associated with the twist-lock connector include both the mechanical integrity of the connection, and its ease of operation, including the ability to easily adjust the axial length of the telescoping tubes.

While only certain preferred embodiments of this invention have been shown and described by way of illustration, many modifications will occur to those skilled in the art. For example, while the twist-lock connector has been described in one embodiment in the context of a vacuum cleaner application, its operation is equally applicable to any service which requires a secure but easily lockable and unlockable connection between interlocking telescopic tubular members.

Furthermore, the assembly has been described as comprising a twist-lock connector in operative communication with a first tubular member and a second tubular member. It should be appreciated, however, that the invention comprehends other assembly configurations. For example, a plurality of twist-lock connectors could be employed with a plurality of telescopic tubular members having successively smaller outer diameters in order to provide an assembly capable of having a greater combined length. Each successive twist-lock connector would have a seating member with a diameter suitable for attachment to the specific diameter of the female end of the successive tubular members.

By way of further example of modifications within the scope of this invention, while the rotatable member has been described as comprising first and second rotatable member camming surfaces in a preferred embodiment, another embodiment could comprise a rotatable member having a single camming surface.

By way of further example of modifications within the scope of this invention, while the twist-lock connector has been described as facilitating the connection of different diameter, telescoping tubular members in a preferred embodiment, another embodiment could comprise a sleeve-type connector having a greater axial length for joining same diameter, non-telescoping tubular members.

It is, therefore, desired that it be understood that it is intended herein to cover all such modifications that fall within the true spirit and scope of this invention.

What is claimed is:

1. A twist-lock connector for adjustably interlocking a first tubular member capable of telescopically receiving within a second tubular member, said twist-lock connector comprising:

(a) a seating member for attaching to said first tubular member and
    (b) a rotatable member for rotatably mounting on said seating member,
        said seating member comprising a cylindrical base portion and first and second arcuate, cantilevered camming members connected to said cylindrical base portion at diametrically opposed connection positions and projecting from the cylindrical base portion in an axial direction relative to the cylindrical base portion, each of said first and second camming members having on its inner periphery a seating member camming surface and on its outer periphery a seating member engaging surface for engaging an outer surface of said second tubular member, and
        wherein said first and second camming members (i) are diametrically opposed to one another relative to an axial direction and together with an outer edge of said cylindrical base portion form an annular engagement groove for receiving said rotatable member and (ii) are spaced apart from each other circumferentially of said seating member so as to define a first and second gap, respectively, therebetween to enable the first and second camming members to flex relative to said connection positions, and
        said rotatable member comprising on its inner periphery first and second rotatable member camming surfaces for engaging said first and second seating member camming surfaces of said first and second camming members, each of said first and second rotatable member camming surfaces forming gradual camming ramps which terminate in diametrically opposed first and second step portions,
        whereby said twist-lock connector is locked by rotating said rotatable member in a first direction until said first and second rotatable member camming surfaces engage said first and second seating member camming surfaces, thereby causing said first and second seating member engaging surfaces to frictionally but releasably engage said outer surface of said second tubular member, and whereby if said rotatable member is rotated farther in said first direction, said twist-lock connector becomes unlocked when said first and second step portions reach said first and second gaps between the first and second camming members.

2. An adjustably interlocking telescopic tubular member assembly, comprising:

(a) a first tubular member having a first tubular member inner diameter;
    (b) a second tubular member having a second tubular member outer diameter, wherein said first tubular member inner diameter can accommodate said second tubular member outer diameter, and
    (c) a twist-lock connector comprising (i) a seating member for attaching to a female end of said first tubular member and (ii) a rotatable member for rotatably mounting on said seating member,
        said seating member comprising a cylindrical base portion and first and second arcuate, cantilevered camming members connected to said cylindrical base portion at diametrically opposed connection positions and projecting from the cylindrical base portion in an axial direction relative to the cylindrical base portion, each of said first and second camming members having on its inner periphery a seating member camming surface and on its outer periphery a seating member engaging surface for engaging an outer surface of said second tubular member,
        wherein said first and second camming members (i) are diametrically opposed to one another relative to an axial direction and together with an outer edge of said cylindrical base portion form an annular engagement groove for receiving said rotatable member and (ii) are spaced apart from each other circumferentially of said seating member so as to define a first and second gap, respectively, therebetween to enable the first and second camming members to flex relative to said connection positions, and
        said rotatable member comprising on its inner periphery first and second rotatable member camming surfaces for engaging said first and second seating member camming surfaces of said first and second camming members, each of said first and second rotatable member camming surfaces forming gradual camming ramps which terminate in diametrically opposed first and second step portions,
        whereby said twist-lock connector is locked by rotating said rotatable member in a first direction until said first and second rotatable member camming surfaces engage said first and second seating member camming surfaces, thereby causing said first and second seating member engaging surfaces to frictionally but releasably engage said outer surface of said second tubular member, and whereby if said rotatable member is rotated farther in said first direction, said twist-lock connector becomes unlocked when said first and second step portions reach said first and second gaps between the first and second camming members.

3. An adjustably interlocking telescopic tubular member assembly according to claim 2, wherein said first tubular member and said second tubular member are vacuum cleaner tubes.

4. A method of adjustably connecting interlocking telescopic tubular members by means of a twist-lock connector comprising (i) a seating member for attaching to a female end of a first tubular member having a first tubular member inner diameter and (ii) a rotatable member for rotatably mounting on said seating member, said seating member comprising a cylindrical base portion and first and second arcuate, cantilevered camming members connected to said cylindrical base portion at diametrically opposed connection positions and projecting from the cylindrical base portion in an axial direction relative to the cylindrical base portion, each of said first and second camming members having on its inner periphery a seating member camming surface and on its outer periphery a seating member engaging surface for engaging an outer surface of a second tubular member having a second tubular member outer diameter, wherein said first tubular member inner diameter can accommodate said second tubular member outer diameter, and wherein said first and second camming members (i) are diametrically opposed to one another relative to an axial direction and together with an outer edge of said cylindrical base portion form an annular engagement groove for receiving said rotatable member and (ii) are spaced apart from each other circumferentially of said seating member so as to define a first and second gap, respectively, therebetween to enable the first and second camming members to flex relative to said connection positions, and said rotatable member comprising on its inner periphery first and second rotatable member camming surfaces for engaging said first and second seating member camming surfaces of said first and second camming members, each of said first and second rotatable member camming surfaces forming gradual camming ramps which terminate in diametrically opposed first and second step portions, said method comprising:

(a) inserting a male end of said second tubular member into a female end of said first tubular member an axial distance sufficient to interlock the tubular members so as to avoid axial flexing and to provide a desired combined length of the second tubular member and the first tubular member; and (b) locking said twist-lock connector by rotating said rotatable member in a first direction until said first and second rotatable member camming surfaces engage said first and second seating member camming surfaces, thereby causing said first and second seating member engaging surfaces to frictionally but releasably engage said outer surface of said second tubular member, whereby if said rotatable member is rotated farther in said first direction, said twist-lock connector becomes unlocked when said first and second step portions reach said first and second gaps between the first and second camming members.

5. A method of adjustably connecting interlocking telescopic tubular members according to claim 4, wherein if during step (b), said rotatable member is rotated in the first direction until the first and second step portions of the first and second rotatable member camming surfaces reach the first and second gaps between the first and second camming members, the twist-lock connector can be locked by rotating said rotatable member in the first direction to a locking position disposed between a first position where the first and second rotatable member camming surfaces first engage the first and second seating member camming surfaces and a second position where the first and second step portions of the first and second rotatable member camming surfaces reach the first and second gaps between the first and second camming members.

6. A method of adjustably connecting interlocking telescopic tubular members according to claim 5, further comprising:

(c) adjusting said combined length of the second tubular member and the first tubular member by (i) rotating said rotatable member in a direction opposite to said first direction until said first and second rotatable member camming surfaces disengage from said first and second seating member camming surfaces, thereby allowing said first and second seating member engaging surfaces to disengage from said outer surface of said second tubular member;

(ii) either inserting said male end of the second tubular member farther into said female end of the first tubular member, or withdrawing said male end of the second tubular member from said female end of the first tubular member, an axial distance sufficient to provide a desired combined length of the second tubular member and the first tubular member; and (iii) locking said twist-lock connector by rotating said rotatable member in said first direction until said first and second rotatable member camming surfaces engage said first and second seating member camming surfaces, thereby causing said first and second seating member engaging surfaces to frictionally but releasably engage said outer surface of said second tubular member.

7. A method of adjustably connecting interlocking telescopic tubular members according to claim 4, wherein said first tubular member and said second tubular member are vacuum cleaner tubes.

* * * * *